US010808791B2

(12) United States Patent
Löhken et al.

(10) Patent No.: US 10,808,791 B2
(45) Date of Patent: Oct. 20, 2020

(54) PISTON-CYLINDER ASSEMBLY

(71) Applicant: Stabilus GmbH, Koblenz (DE)

(72) Inventors: Lars Löhken, Bonn (DE); Ulrich Probst, Hillscheid (DE); Raphael Piroth, Koblenz (DE); Markus Müller, Koblenz (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 15/831,948

(22) Filed: Dec. 5, 2017

(65) Prior Publication Data
US 2018/0156294 A1 Jun. 7, 2018

(30) Foreign Application Priority Data
Dec. 5, 2016 (DE) .......................... 10 2016 123 460

(51) Int. Cl.
*F16F 9/44* (2006.01)
*F16F 9/02* (2006.01)
*F16F 9/58* (2006.01)
*F16F 9/46* (2006.01)

(52) U.S. Cl.
CPC .......... *F16F 9/0245* (2013.01); *F16F 9/0218* (2013.01); *F16F 9/0227* (2013.01); *F16F 9/446* (2013.01); *F16F 9/464* (2013.01); *F16F 9/58* (2013.01); *F16F 9/585* (2013.01)

(58) Field of Classification Search
CPC .. F16F 9/0245; F16F 9/464; F16F 9/58; F16F 9/40–44
USPC .................. 188/300; 267/64.11, 64.12, 120, 267/122–124
See application file for complete search history.

(56) References Cited

U.S. PATENT DOCUMENTS

| | | | |
|---|---|---|---|
| 2,614,536 A | 10/1952 | Livers | |
| 3,979,109 A * | 9/1976 | Ishida | ...................... A47C 3/30 293/124 |
| 4,257,582 A * | 3/1981 | Wirges | ...................... A47C 3/30 188/300 |

(Continued)

FOREIGN PATENT DOCUMENTS

| DE | 7246111 U | 4/1977 |
|---|---|---|
| DE | 2708958 A1 | 10/1977 |

(Continued)

OTHER PUBLICATIONS

European Application EP17201493, Search Report dated Apr. 12, 2018, 2 Pages.

(Continued)

*Primary Examiner* — Christopher P Schwartz
(74) *Attorney, Agent, or Firm* — Lucas & Mercanti, LLP

(57) ABSTRACT

A piston-cylinder assembly includes a cylinder having a cylinder interior filled with a fluid and divided by a piston, which is axially displaceable in cylinder, into a first working space and a second working space. A piston rod is arranged on piston and is guided through second working space and through an end-side second closure in a manner sealed off to the outside at the second end of the cylinder. The retraction stroke of piston and piston rod is restricted by a stop which is arranged in cylinder and against which piston comes to bear directly or indirectly, wherein the axial position of the stop in cylinder is variably adjustable by an adjustment device.

20 Claims, 9 Drawing Sheets

(56) References Cited

U.S. PATENT DOCUMENTS

| | | | | |
|---|---|---|---|---|
| 4,303,231 A * | 12/1981 | Reuschenbach | ...... | F16F 9/0245 188/300 |
| 4,307,874 A * | 12/1981 | Reuschenbach | .......... | F16F 9/56 188/284 |
| 4,635,908 A * | 1/1987 | Ludwig | ................... | F16F 9/585 188/322.15 |
| 4,699,044 A * | 10/1987 | Riggs | ..................... | F01B 11/00 92/13 |
| 4,779,851 A * | 10/1988 | Bauer | ................... | F16F 9/0245 188/300 |
| 5,097,928 A * | 3/1992 | Enders | ..................... | A47B 9/10 188/282.2 |
| 5,360,230 A * | 11/1994 | Yamada | ............... | B60G 17/018 188/314 |
| 5,468,042 A * | 11/1995 | Heinrichs | ............. | E05C 17/305 16/51 |
| 5,839,719 A * | 11/1998 | Hosan | ..................... | B62D 25/12 267/64.12 |
| 6,347,573 B1 * | 2/2002 | Henkel | ................. | F16F 9/0245 92/13.51 |
| 7,487,708 B2 * | 2/2009 | Harashima | .............. | F15B 15/24 92/13.6 |
| 8,240,440 B2 * | 8/2012 | Massmann | ............ | F16F 9/0245 188/266.2 |
| 8,382,076 B2 * | 2/2013 | Etzkorn | ................ | F16F 9/0245 188/281 |
| 8,561,766 B2 * | 10/2013 | Born | ....................... | F16F 9/461 188/282.4 |
| 2003/0042661 A1 * | 3/2003 | Popjoy | .................. | F16F 9/0245 267/64.28 |
| 2004/0061266 A1 * | 4/2004 | Riel | ...................... | F16F 9/0272 267/124 |
| 2005/0214132 A1 | 9/2005 | Harashima | | |
| 2006/0290037 A1 * | 12/2006 | Born | .................... | F16F 9/0218 267/120 |
| 2007/0007091 A1 * | 1/2007 | Brehler | ..................... | F16F 9/46 188/266.1 |
| 2009/0236783 A1 * | 9/2009 | Doffing | ................ | F16F 9/0254 267/124 |
| 2016/0003319 A1 * | 1/2016 | Pooschen | .............. | F16F 9/0245 188/313 |

FOREIGN PATENT DOCUMENTS

| | | |
|---|---|---|
| DE | 3308928 A1 | 9/1984 |
| DE | 4242601 A1 | 6/1994 |
| DE | 10046961 A1 | 4/2001 |
| GB | 1525369 A | 9/1978 |

OTHER PUBLICATIONS

Chinese Application 201711258372.4, Office Action dated May 5, 2019, 5 Pages.

Chinese Application 201711258372.4, Office Action dated Nov. 15, 2019, 2 Pages.

* cited by examiner

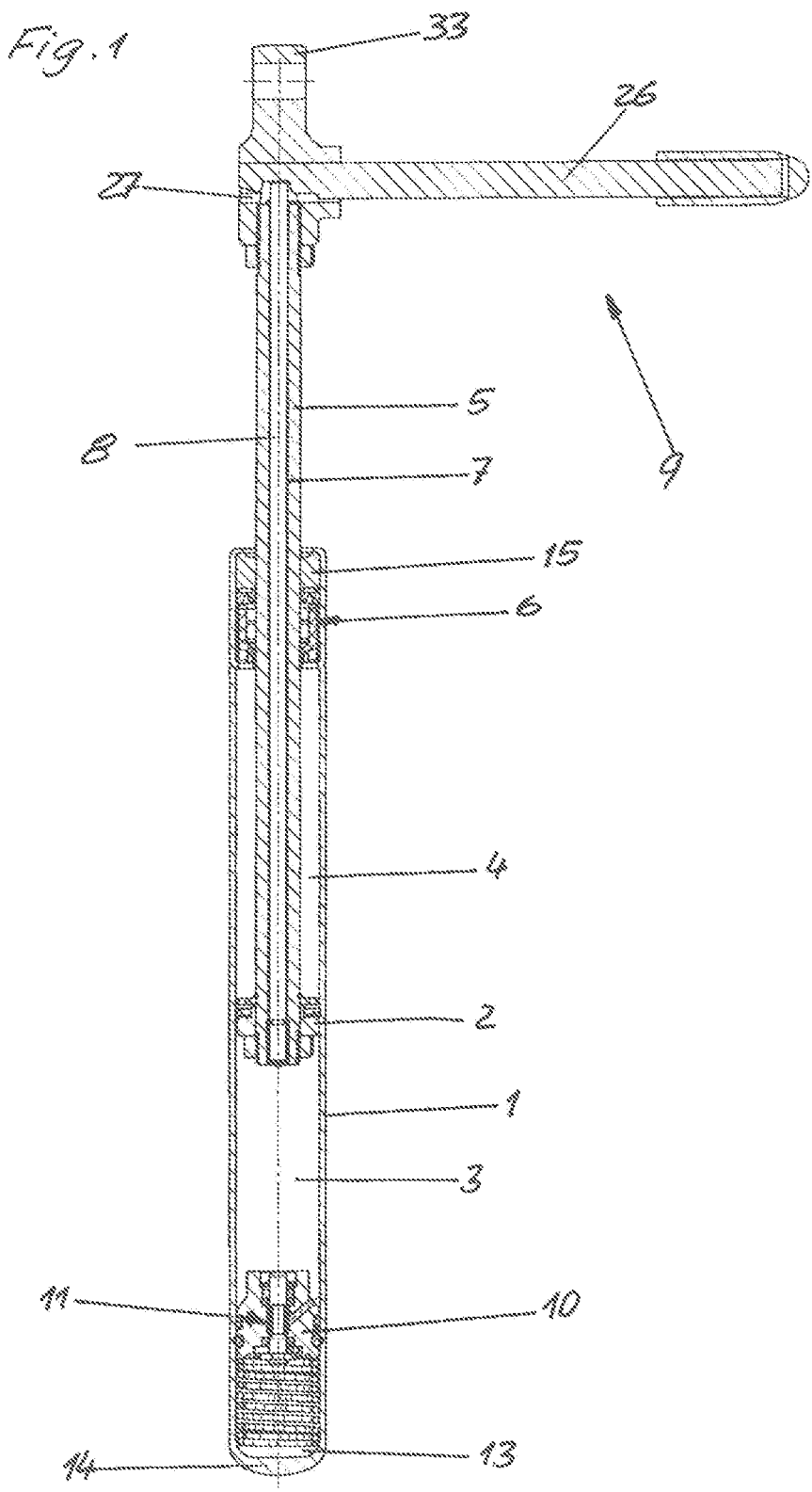

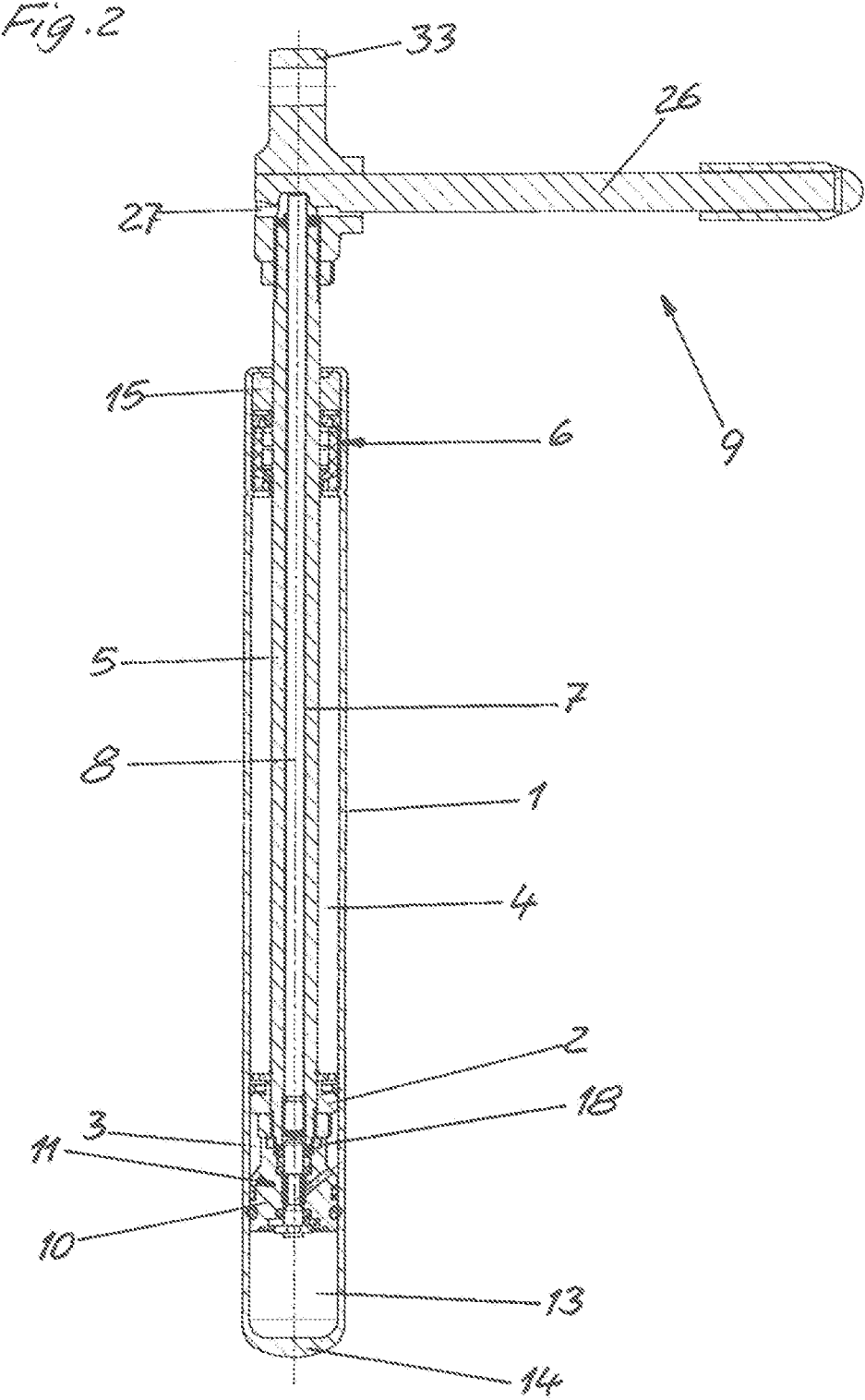

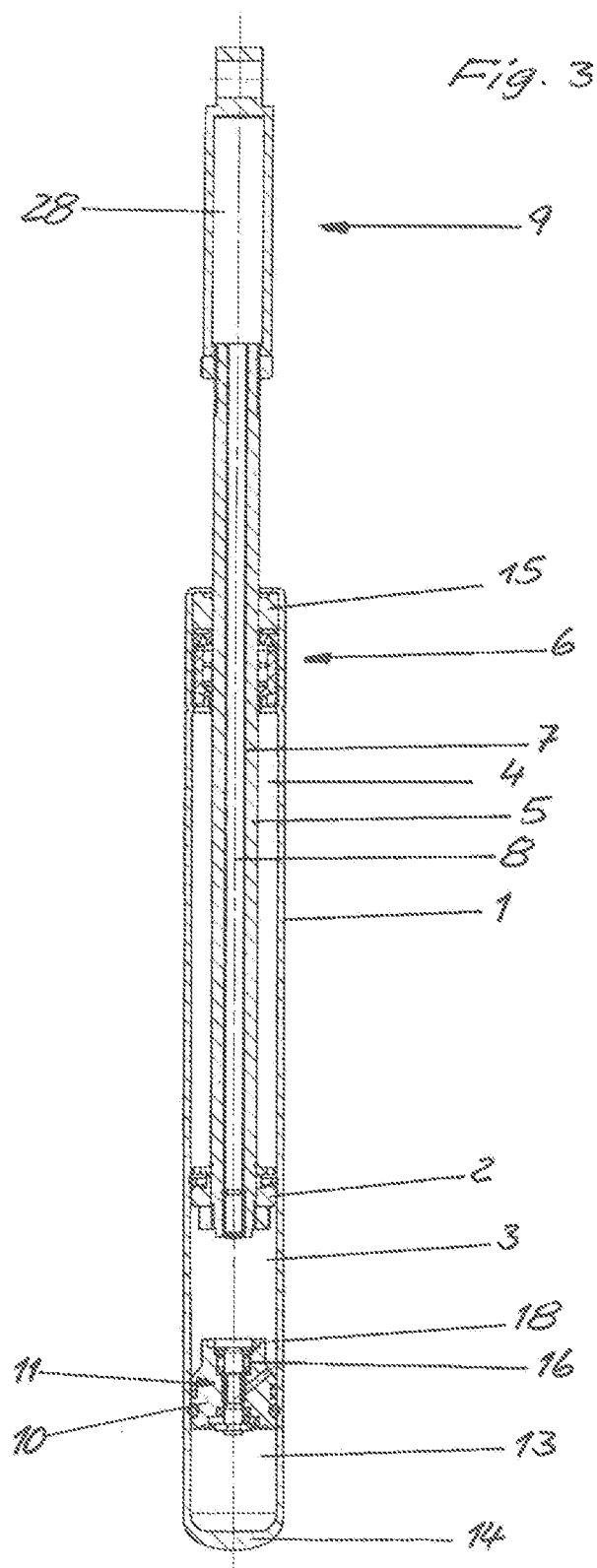

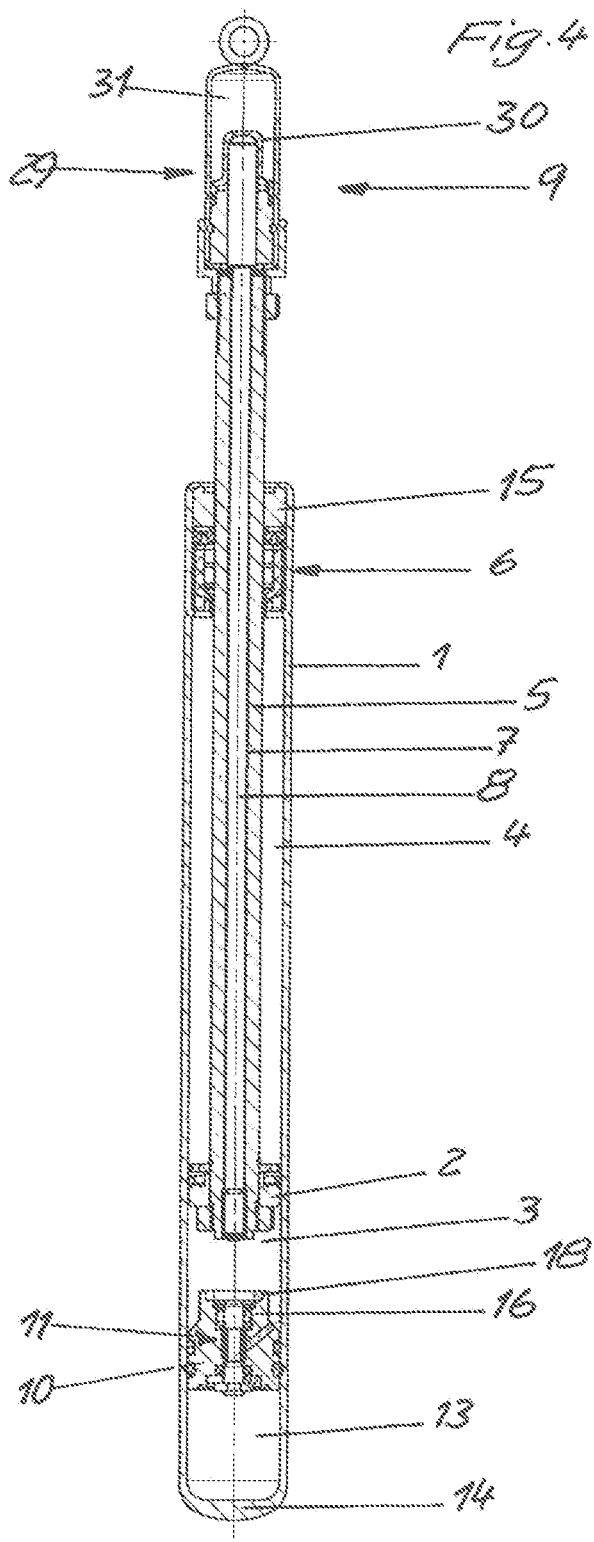

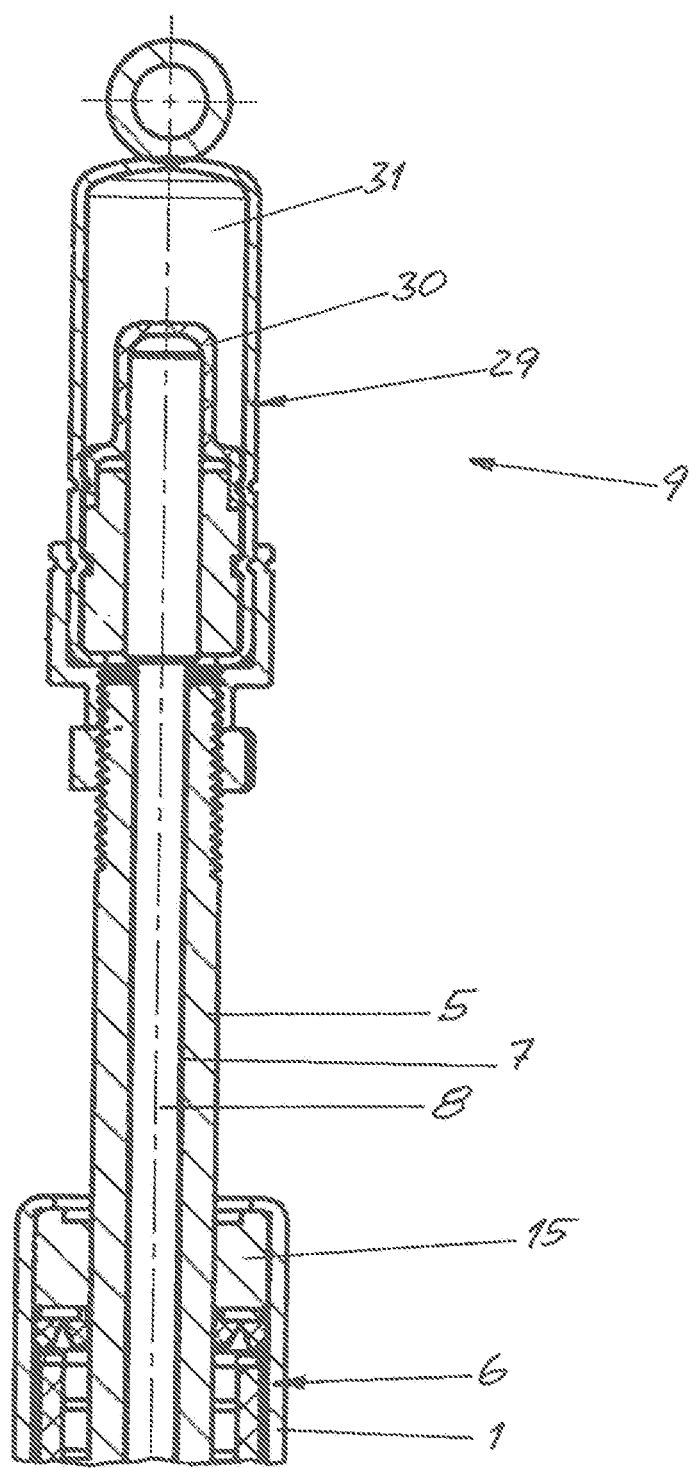

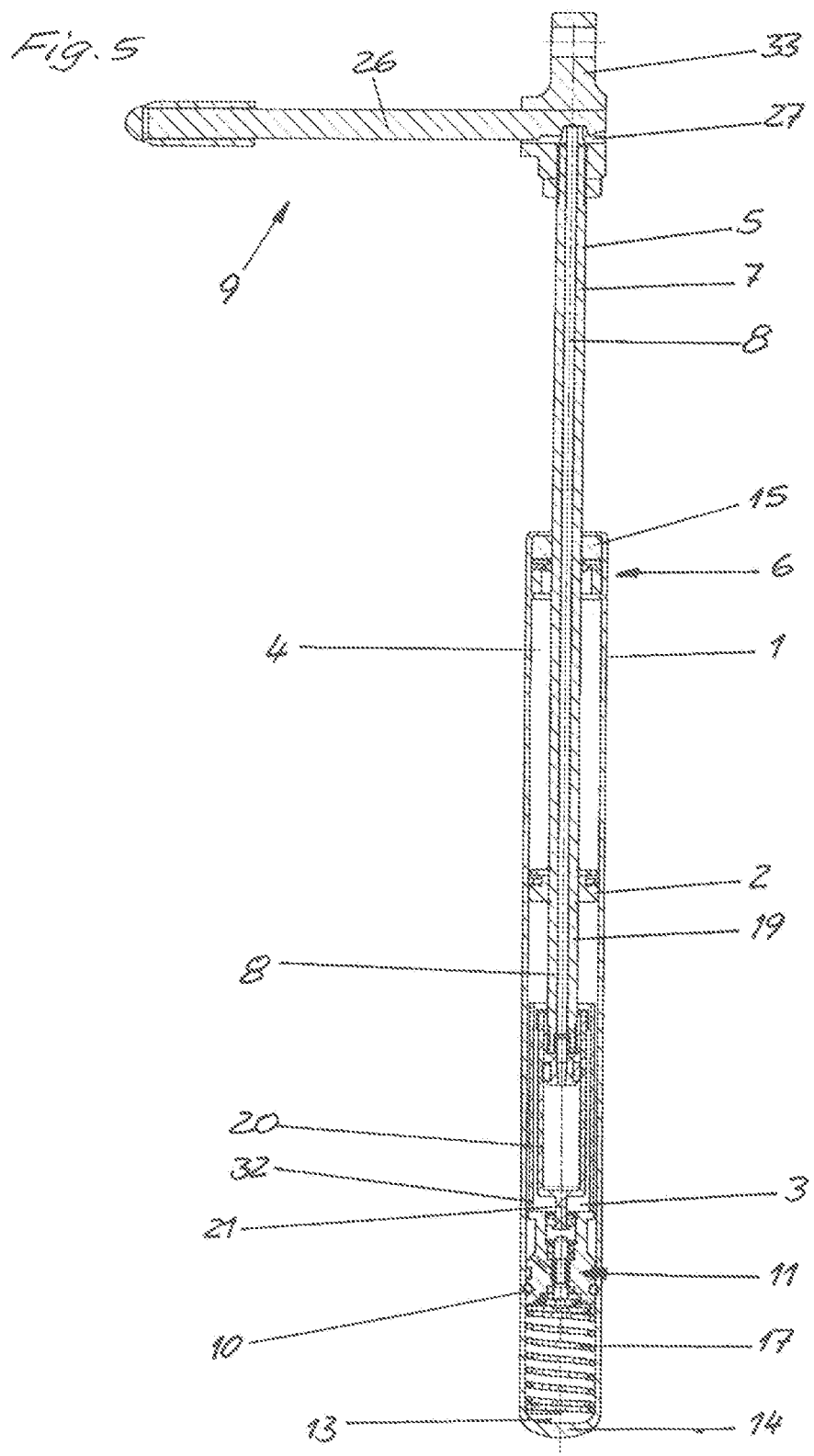

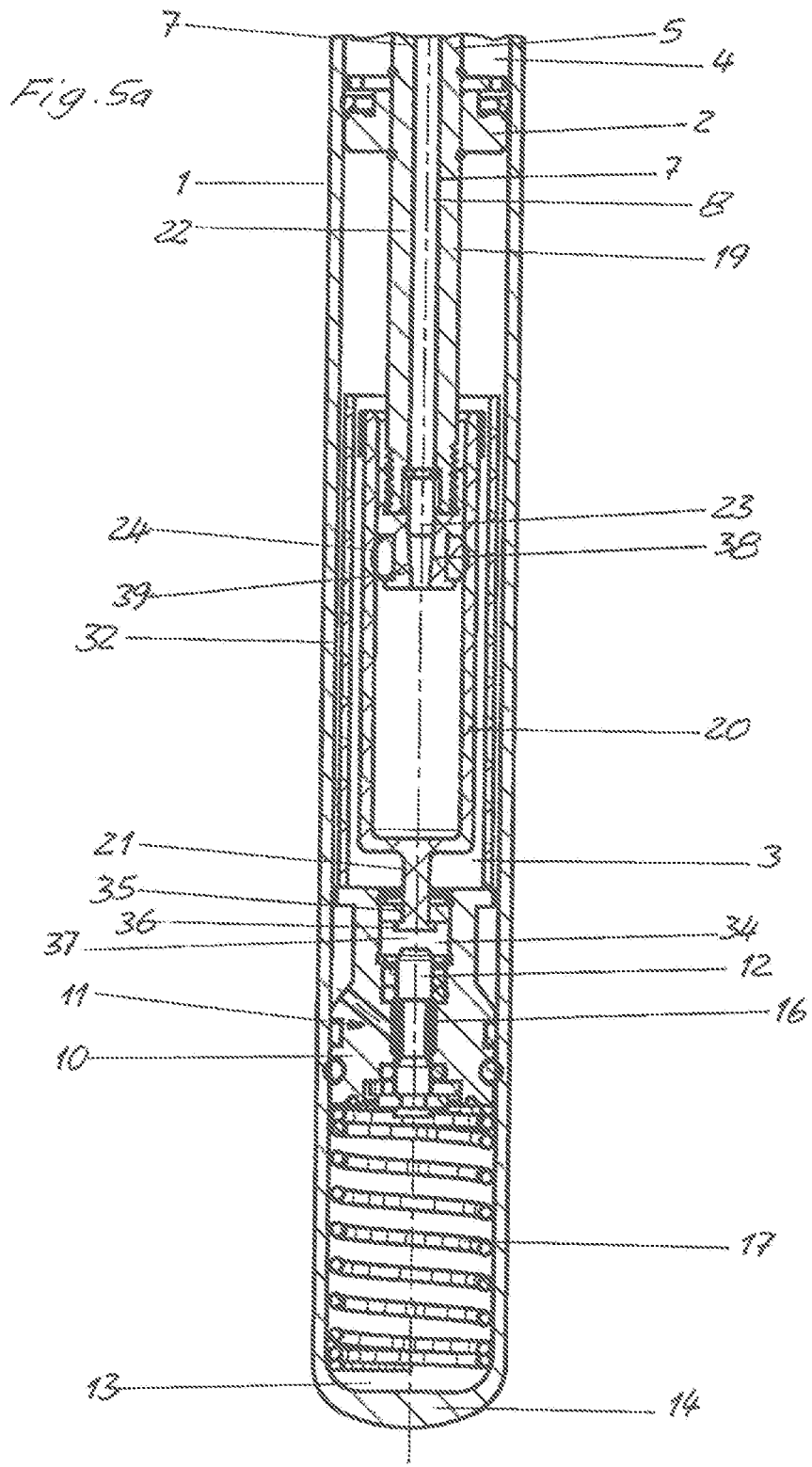

PISTON-CYLINDER ASSEMBLY

BACKGROUND OF THE INVENTION

The invention relates to a piston-cylinder assembly with a cylinder which is filled with a fluid, a piston that is axially displaceable in an interior of the cylinder and divides the interior of the cylinder into a first working space and a second working space, and a piston rod arranged on the piston and which is guided through the second working space and through an end-side second closure in a manner sealed off to the outside at a second end of the cylinder.

In the case of such piston-cylinder assemblies, only the pushed-in end position and the pushed-out end position are reproducible positions, but an intermediate position is not. Lockable piston-cylinder assemblies can indeed also be positioned in an intermediate position between the pushed-in end position and the pushed-out end position, but this intermediate position is not reproducible.

BRIEF SUMMARY OF THE INVENTION

The object of the invention is therefore to create a piston-cylinder assembly with a simple structure that, apart from in the pushed-in end position and the pushed-out end position, can also be positioned reproducibly in any desired intermediate position between the pushed-in end position and the pushed-out end position.

The object of the present invention is achieved by an embodiment of a piston-cylinder assembly with a stop arranged in the cylinder that restricts the retraction stroke of piston and piston rod in that the piston comes to bear directly or indirectly against the stop. An adjustment device enables variable adjustment of an axial position of the stop in the cylinder.

The axial position of the stop is adjustable to a desired intermediate position so that the maximum stroke of the piston and the piston rod is restricted by the piston striking against the stop. The adjustability of the stop makes it possible to vary the axial position of the stop.

To fulfill the function of a gas spring, the cylinder is preferably filled with a pressurized gas.

In a simple embodiment, the stop is a stop piston arranged displaceably in a sealed off manner in the cylinder, the stop piston dividing the first working space from a stop space between the stop piston and an end-side first closure at the first end of the cylinder. A valve is arranged in the stop piston that is adjustable by an actuating device from a closed position into an open position which connects the first working space to the stop space. In the open position of the valve device, the stop piston can be guided towards the piston.

To guide the stop piston towards the piston, the stop piston can be coupled to the piston. For this purpose, the stop piston is acted upon by a pretensioned spring towards the piston in one embodiment. In an alternative embodiment, a magnet is arranged on the stop piston and the piston is composed of a ferromagnetic material or has a ferromagnetic part. In the case of the piston bearing against the stop piston, the piston is coupled in a force-fitting manner by the magnetic field of the magnet to the stop piston. The valve device preferably has a closing element which can be axially moved by the actuating device, wherein the valve device can be a slide valve with a valve slide or a seat valve with a seat closing element. The valve slide or the seat closing element can be moved by the actuating device from the closed position into the open position. This embodiment of the valve device has a simple form and is thus largely unsusceptible to defects.

A simply formed embodiment for opening the valve device includes an actuating rod, which protrudes axially from the outside into the interior of the cylinder, it being possible for the valve slide or the seat closing element to move from the closed position into the open position by means of an actuating rod.

In this case, it saves installation space if the piston rod has a continuous axial bore in which the actuating rod is guided in a sealed off and axially moveable manner. In this embodiment, the piston rod can be acted upon at its outer end with an actuating force. More specifically, the actuating rod can be acted upon by an actuator or manually at its outer end with an actuating force.

According to one advantageous embodiment for actuating the valve device, the piston has a projection rod, which projects into the first working space, and has a continuous coaxial through-bore. A telescopic sleeve encloses the projection rod and is telescopically displaceable relative thereto. The telescopic sleeve can be coupled in a force-fitting manner to the projection rod, as a result of which the valve slide or the seat closing element of the valve device can be acted upon movably in its opening direction by the end of the telescopic sleeve facing the stop piston.

For simple force-fitting coupling, the free end of the actuating rod protruding out of the projection rod into the interior of the telescopic sleeve can have an expansion element which protrudes into a central opening of a ring-like friction element. Upon actuation of the actuating rod by the actuating device, the friction element can be radially expanded and pressed against the inner wall of the telescopic sleeve.

According to another embodiment, the valve device is actuatable in that the valve device is an electromagnetically or electromechanically actuable valve device.

A structure which is unsusceptible to defects can be achieved in that the pretensioned spring which acts upon the stop piston is a helical compression spring which is supported with one end on the end-side first closure at the first end of the cylinder and with its other end on the stop piston.

BRIEF DESCRIPTION OF THE DRAWINGS

Exemplary embodiments of the invention are represented in the drawing and are explained in greater detail below. In the drawings:

FIG. 1 is a longitudinal sectional view of a first exemplary embodiment of a piston-cylinder assembly according to the present invention;

FIG. 2 is a longitudinal sectional view of a second exemplary embodiment of a piston-cylinder assembly according to the present invention;

FIG. 3 is a longitudinal sectional view of a third exemplary embodiment of a piston-cylinder assembly according to the present invention;

FIG. 4 is a longitudinal sectional view of a fourth exemplary embodiment of a piston-cylinder assembly according to the present invention;

FIG. 4a is an enlarged cut-out of the piston-cylinder assembly according to FIG. 4;

FIG. 5 is a longitudinal sectional view of a fifth exemplary embodiment of a piston-cylinder assembly according to the present invention; and FIG. 5a is an enlarged cut-out of the piston-cylinder assembly according to FIG. 5.

DETAILED DESCRIPTION OF THE PREFERRED EMBODIMENTS

Figure 1A:
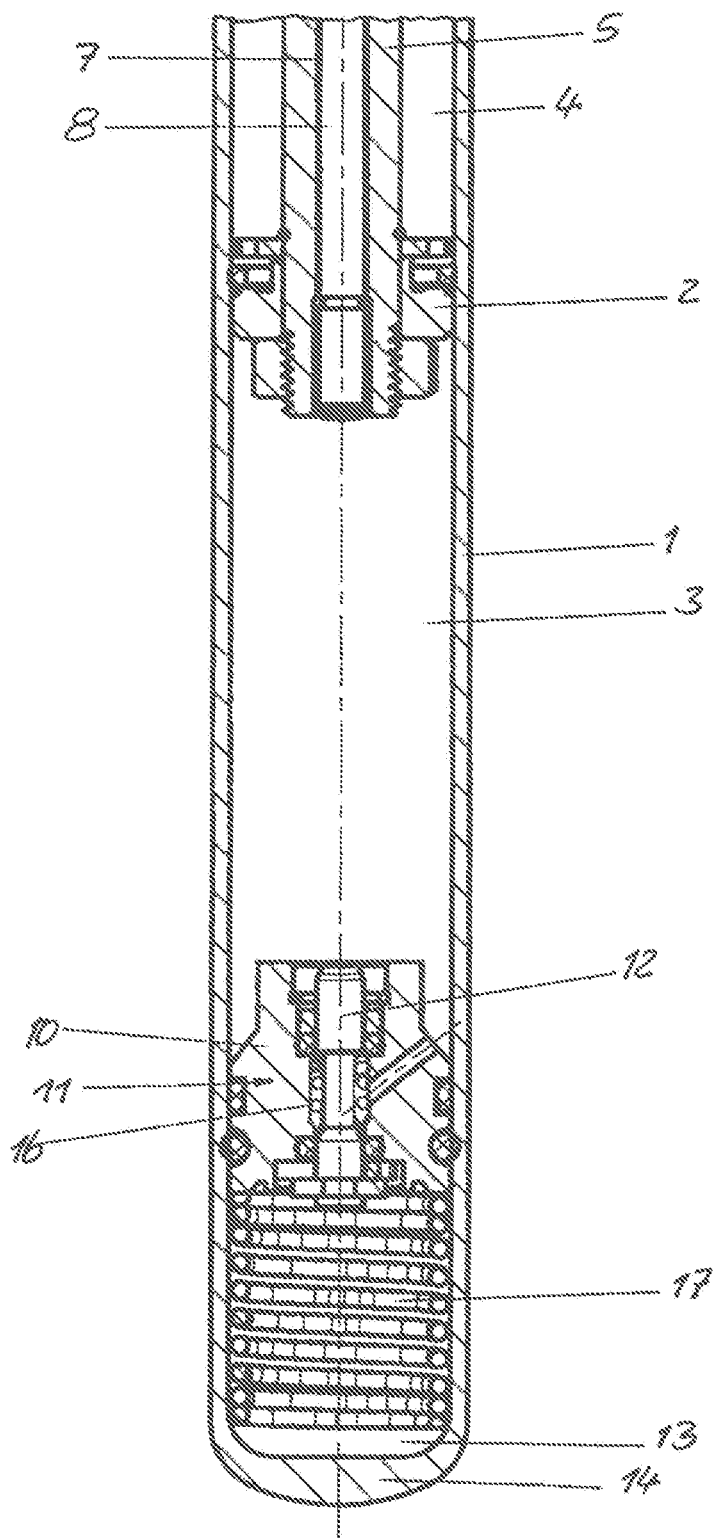
FIG. 1a is an enlarged cut-out of the piston-cylinder assembly according to FIG. 1.

The piston-cylinder assemblies represented in the Figures have a cylinder 1 which is closed off at its ends by a first closure 14 and a second closure 15 and in which a piston 2 is arranged axially displaceably. Piston 2 divides the inner space of cylinder 1 filled with a fluid into a first working space 3 and a second working space 4.

A piston rod 5 arranged on one side of piston 2 extends coaxially through second working space 4 and is guided to the outside through a guide and sealing unit 6 and second closure 15.

Piston rod 5 has a continuous axial bore 7 in which an actuating rod 8 is guided axially displaceably. An actuating device 9 is arranged on the piston rod 5. The actuating device 9 acts on the end of actuating rod 8 protruding to the outside from piston rod 5 to drive the actuating rod 8 directly or indirectly in an axially moveable manner.

A stop piston 10 in cylinder 1 is arranged axially displaceably in the end region of first working chamber 3 opposite piston rod 5, which stop piston 10 separates first working space 3 from a stop space 13 between first working space 3 and first closure 14 of cylinder 1. The push-in stroke of piston 2 and piston rod 5 can be restricted by stop piston 10 in that piston 2 or a component connected to piston 2 comes to hear against stop piston 10.

There is arranged in stop piston 10 a slide valve 11 which has a valve slide 12 which is axially displaceable in a coaxial bore in stop piston 10 and which, in its unactuated position, blocks a connection from first working space 3 to stop space 13 and thus fixes stop piston 10 in its assumed position.

In the embodiments of FIGS. 1-4a, to open the slide valve 11, piston rod 5 moves with piston 2 until piston 2 bears against stop piston 10. If actuating rod 8 is now displaced towards stop piston 10 by actuating device 9 so that the free end of actuating rod 8 projecting into cylinder 1 comes to bear at the end side against valve slide 12 and, in the case of further displacement, displaces it counter to the force of a spring 16 towards stop space 13, the slide valve 11 can be opened.

As a result of opened slide valve 11, the fixing of stop piston 10 is released and fluid can flow out of stop space 13 into first working space 3 and vice versa.

To achieve a larger stroke, stop piston 13 is displaced from piston 2 towards first closure 14 by further retraction of piston rod 5 into the cylinder 1.

In the embodiment of FIGS. 1 and 1a, a smaller stroke can be achieved by allowing a pretensioned helical compression spring 17 arranged in stop space 13 and supported with one end on first closure 14 to act on the stop piston. If, in the case of opened slide valve 11, piston rod 5 is moved with piston 2 in the extension direction, stop piston 10 follows piston 2 because of the action by helical compression spring 17. In the now desired new end position of stop piston 10, actuating rod 8 is retracted again into axial bore 7 of piston rod 5 by actuating device 9, as a result of which valve slide 12 again moves into its end position as a result of it being acted upon by a valve spring 16 and the connection between stop space 13 and first working space 3 is closed. Stop piston 10 is thus fixed again.

Figure 2A:
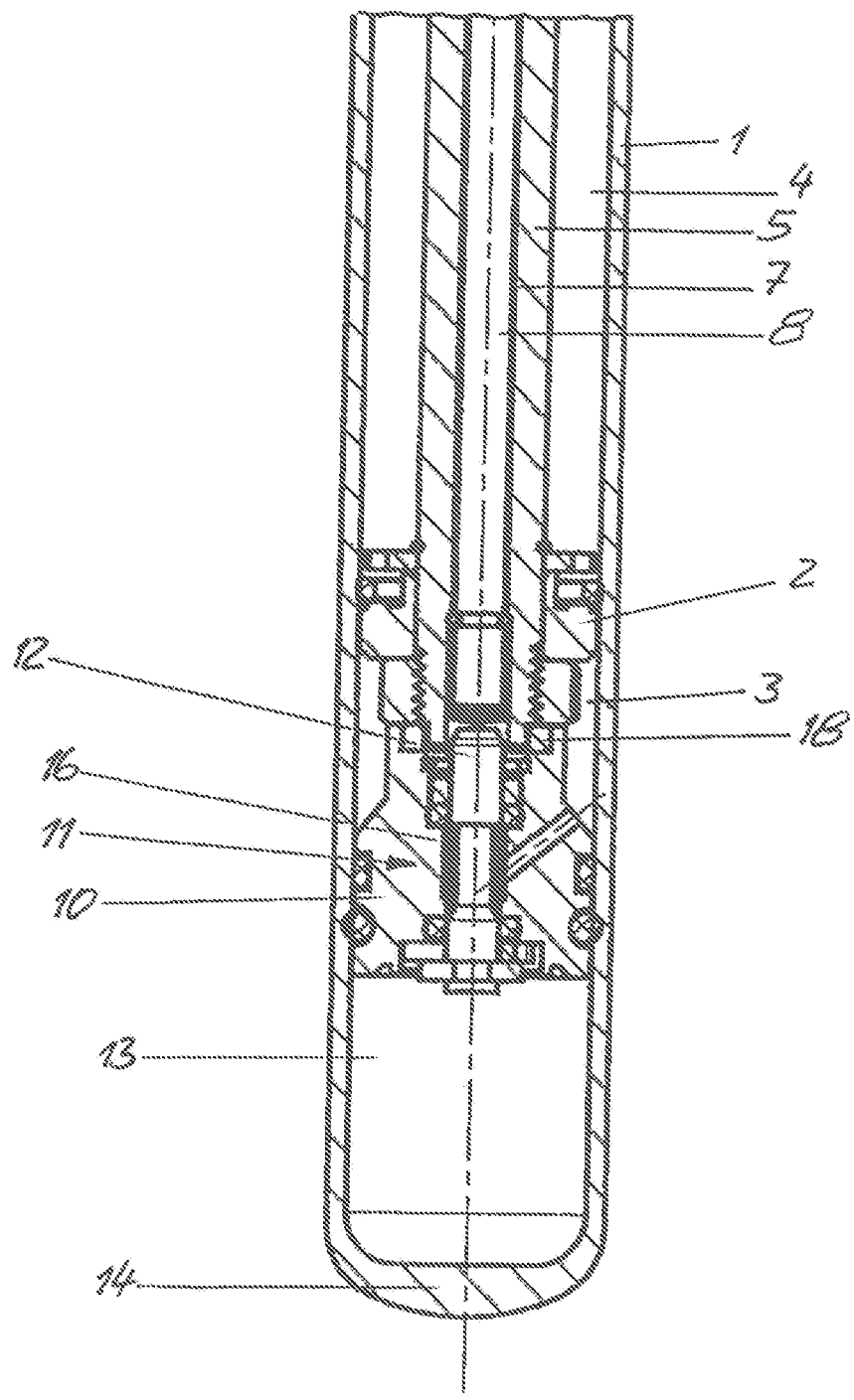
FIG. 2a is an enlarged cut-out of the piston-cylinder assembly according to FIG. 2.

In the case of the exemplary embodiment of FIGS. 2 and 2a, the structure and the function are the same as in the case of the exemplary embodiments of FIGS. 1 and 1a except for the fact that no helical compression spring 17 is present. Instead, a magnet formed as a magnetic ring 18 is present on stop piston 10. In this embodiment, the piston 2 comprises a ferromagnetic material. If piston 2 comprising the ferromagnetic material moves towards stop piston 10, stop piston 10 is thus coupled to piston 2 by the magnetic field of magnetic ring 18.

During opening of slide valve 11 in the manner described in relation to FIGS. 1 and 1a, piston rod 5 can thus be displaced with piston 2 and stop piston 10 coupled thereto into stop space 13 or into first working space 3 in order then to be fixed again in the new end position by closing slide valve 11.

The structure of stop piston 10 with slide valve 11 and its actuation by actuating rod 8 of the embodiments of FIGS. 3 and 4 correspond to the embodiment of FIGS. 2 and 2a.

In the case of the embodiment of FIGS. 5 and 5a, the structure of stop piston 10, which is acted upon by helical compression spring 17, with slide valve 11 and its function correspond to the structure and the function of the exemplary embodiment of FIGS. 1 and 1a.

In the embodiment of FIGS. 5 and 5a, piston 2 possesses a projection rod 19, which protrudes into first working space 3 and includes a continuous coaxial through-bore 22. The projection rod 19 is enclosed by a telescopic sleeve 20 which is telescopically displaceable relative thereto. The end of telescopic sleeve 20 that faces stop piston 10 and projects beyond the free end of projection rod 19 includes a coaxial actuating pin 21, which projects towards stop piston 143. Actuating pin 21 projects through a coaxial pin opening 35 into a chamber 34 which is open with respect to first working space 3. A free end of actuating pin 21 has a radial expansion 36 of greater radial extent than pin opening 35, with the result that actuating pin 21 is movably arranged on stop piston 10 so that the actuating pin 21 can move axially through a length of an axial clearance 37.

An axially conical expansion element 23 is arranged on the free end of actuating rod 8 projecting out of projection rod 19, which expansion element 23 protrudes into a correspondingly axial conical recess 38 of a radially elastically deformable carrier ring 39 which is connected to projection rod 19. Carrier ring 39 is in turn enclosed by a ring-like friction element 24. Upon actuation of release lever 26, expansion element 23 is pushed deeper into conical recess 38 of carrier ring 39 by actuating rod 8, as a result of which carrier ring 39 and ring-type friction element 24 enclosing it are radially expanded. As a result, friction element 24 is pressed against an inner wall of telescopic sleeve 20. Projection rod 19 connected to piston 2 and piston rod 5 is thus coupled to telescopic sleeve 20. By displacing piston rod 5, actuating pin 21 can thus overcome clearance 37 until actuating pin 21 bears against valve slide 12 and displaces valve slide 12 into the open position in which the connection between stop space 13 and first working space 3 is opened.

Stop piston 10 is thus moved into the desired new end position by moving piston rod 5 and telescopic sleeve 20 coupled thereto. By moving back actuating rod 8, the coupling of telescopic sleeve 20 is released by piston rod 5, with the result that telescopic sleeve 20 is freely displaceable and spring 16 can displace valve slide 12 back into its closed position. As a result, the occupied end position of stop piston 10 is fixed.

In order to avoid an opening of slide valve 11 if no opening actuation by actuating rod 8 is present, a spacer sleeve 32 which encloses telescopic sleeve 20 with a spacing is arranged on piston 2. In the event of an unactuated actuating rod 8 and retracted piston rod 5, spacer sleeve 32 comes to bear against stop piston 10, while telescopic sleeve 20 is freely displaceable on projection rod 19.

In the embodiments of FIGS. 1, 1a and 5, 5a, actuating device 9 comprises a release lever 26 which extends radially with respect to piston rod 5 and projects with one end into a recess 27 directed transversely to the longitudinal extent of piston rod 5 in a connection piece 33 of piston rod 5 and is tiltable therein. Tilting is carried out by manual exertion of force on the free end of release lever 26 transverse to its longitudinal extent. As a result of the tilting, actuating rod 8 is displaced in the opening direction of slide valve 11.

In FIG. 3, actuating device 9 is an electromechanical drive 28, by which actuating rod 8 can be displaceably driven, which is arranged at the outer end of piston rod 5.

In the embodiment of FIGS. 4 and 4a, actuating device 9 includes an expansion material element 29 arranged on the outer end of piston rod 5. A piston of expansion material element 29 can be movably acted upon by expansion material 31. In the present case, a diaphragm 30 acts on actuating rod 8 and thus drives actuating rod 8 in a displaceable manner. Stop piston 10 is thus adjusted in a temperature-dependent manner by expansion material 31 which changes its volume in a temperature-dependent manner.

Of course, the actuating device 9 may alternatively include any other suitable device arranged on the outer end of piston rod 5 to adjust actuating rod 8.

LIST OF REFERENCE NUMBERS

1 Cylinder
2 Piston
3 First working space
4 Second working space
5 Piston rod
6 Guide and sealing unit
7 Axial bore
8 Actuating rod
9 Actuating device
10 Stop piston
11 Slide valve
12 Valve slide
13 Stop space
14 First closure
15 Second closure
16 Valve spring
17 Helical compression spring
18 Magnetic ring
19 Projection rod
20 Telescopic sleeve
21 Actuating pin
22 Through-bore
23 Expansion element
24 Friction element
26 Release lever
27 Recess
28 Drive
29 Expansion material element
30 Diaphragm
31 Expansion material
32 Spacer sleeve
33 Connecting piece
34 Chamber
35 Pin opening
36 Radial expansion
37 Clearance
38 Conus recess
39 Carrier ring

What is claimed is:

1. A piston-cylinder assembly, comprising:
a cylinder having a first end and a second end and defining a cylinder interior, the cylinder having an end-side first closure at the first end and an end-side second closure at the second end;
a piston axially displaceably disposed in the cylinder and dividing the cylinder interior into a first working space and a second working space;
a piston rod arranged on the piston and guided through the second working space and through the end-side second closure in a manner sealed off to the outside at the second end of the cylinder;
a stop arranged at a fixed position in the cylinder against which the piston can come to bear directly or indirectly at an end position of a retraction stroke of the piston and the piston rod into the cylinder so that the fixed position of the stop defines the end position of the retraction stroke of the piston and the piston rod into the cylinder; and
an adjustment device actuatable to allow an axial adjustment of the fixed position of the stop in the cylinder and thereby allow adjustment of the end position of the retraction stroke,
wherein the stop is a stop piston arranged displaceably in a sealed off manner in the cylinder, the stop piston dividing the first working space from a stop space between the stop piston and the end-side first closure at the first end of the cylinder, and the stop piston including a valve device adjustable by an actuating device from a closed position into an open position, the valve device connecting the first working space to the stop space in the open position of the valve device, and the stop piston can be guided towards the piston in the open position of the valve device.

2. The piston-cylinder assembly according to claim 1, wherein the valve device is a slide valve with a valve slide or a seat valve with a seat closing element, and wherein the actuating device is actuatable to move the valve slide or the seat closing element from the closed position into the open position.

3. The piston-cylinder assembly according to claim 2, further comprising an actuating rod protruding axially from the outside into the interior of the cylinder, the actuating device acting on the actuating rod, wherein the valve slide or the seat closing element can be moved from the closed position into the open position by the actuating rod.

4. The piston-cylinder assembly according to claim 3, wherein the piston has a projection rod, which protrudes into the first working space, the projection rod having a continuous coaxial through-bore and is enclosed by a telescopic sleeve which is telescopically displaceable relative to the projection rod, wherein the telescopic sleeve is selectively couplable in a force-fitting manner to the projection rod, the valve slide or the seat closing element of the valve device can be acted upon movably in its opening direction by an end of the telescopic sleeve facing the stop piston.

5. The piston-cylinder assembly according to claim 4, wherein a free end of the actuating rod protruding out of the projection rod into the interior of the telescopic sleeve has an expansion element protruding into a central opening of a ring-like friction element, wherein, upon actuation of the actuating rod by the actuating device, the friction element can be radially expanded and pressed against the inner wall of the telescopic sleeve.

6. The piston-cylinder assembly according to claim 3, wherein the piston rod has a continuous axial bore in which the actuating rod, which can be acted upon at its outer end with an actuating force, is guided in a sealed off and axial moveable manner.

7. The piston-cylinder assembly according to claim 3, wherein the actuating rod can be acted upon manually at its outer end with an actuating force through the actuating device.

8. The piston-cylinder assembly according to claim 3, wherein the actuating device includes an expansion material element with an expansion material piston configured to act on the outer end of the actuating rod with an actuating force.

9. The piston-cylinder assembly according to claim 1, further comprising an actuating device disposed on the piston rod that is operable to actuate the adjustment device when the piston is in the end position of the retraction stroke.

10. The piston-cylinder assembly according to claim 9, further comprising an actuating rod that protruding axially from the outside into the interior of the cylinder, the actuating device acting on the actuating rod.

11. The piston-cylinder assembly according to claim 10, wherein the adjustment device is adjustable by the actuating device via the actuating rod from a first position preventing the axial adjustment to a second position allowing the axial adjustment.

12. The piston-cylinder assembly according to claim 9, wherein the adjustment device is adjustable by the actuating device from a first position preventing the axial adjustment to a second position allowing the axial adjustment.

13. The piston-cylinder assembly according to claim 9, wherein the actuating device is disposed on a portion of the piston rod that is outside of the cylinder.

14. The piston-cylinder assembly according to claim 1, wherein the cylinder is filled with a pressurized gas.

15. The piston-cylinder assembly according to claim 1, further comprising a pretensioned spring acting on the stop piston and urging the stop piston towards the piston.

16. The piston-cylinder assembly according to claim 1, further comprising a magnet arranged on the stop piston, wherein the piston is composed of a ferromagnetic material or has a ferromagnetic part, the piston is coupled in a force-fitting manner by the magnetic field of the magnet to the stop piston when the piston bears against the stop piston.

17. The piston-cylinder assembly according to claim 1, wherein the valve device includes a closing element which can be axially moved by the actuating device.

18. The piston-cylinder assembly according to claim 1, wherein the adjustment device is an electromagnetically or electromechanically actuable valve device.

19. The piston-cylinder assembly according to claim 1, wherein the pretensioned spring which acts upon the stop piston is a helical compression spring supported with one end on the end-side first closure at the first end of the cylinder and with its other end on the stop piston.

20. A piston-cylinder assembly, comprising:
a cylinder having a first end and a second end and defining a cylinder interior, the cylinder having an end-side first closure at the first end and an end-side second closure at the second end;
a piston axially displaceably disposed in the cylinder and dividing the cylinder interior into a first working space and a second working space;
a piston rod arranged on the piston and guided through the second working space and through the end-side second closure in a manner sealed off to the outside at the second end of the cylinder;
a stop arranged at a fixed position in the cylinder against which the piston can come to bear directly or indirectly at an end position of a retraction stroke of the piston and the piston rod into the cylinder so that the fixed position of the stop defines the end position of the retraction stroke of the piston and the piston rod into the cylinder; and
an adjustment device actuatable to allow an axial adjustment of the fixed position of the stop in the cylinder and thereby allow adjustment of the end position of the retraction stroke, wherein the adjustment device is an electromagnetically or electromechanically actuable valve device.

* * * * *